June 3, 1924.
A. B. SEPPMANN
TROUBLE FINDER
Filed April 14, 1923  2 Sheets-Sheet 1
1,496,384
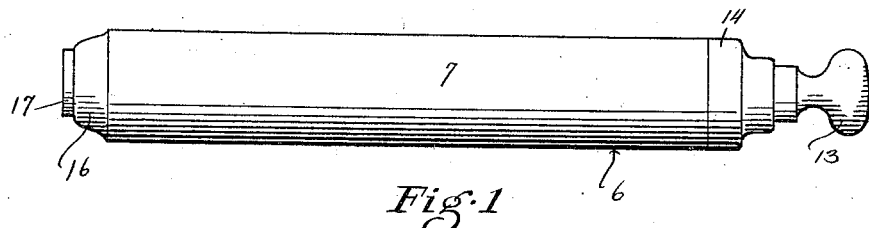
Fig. 1
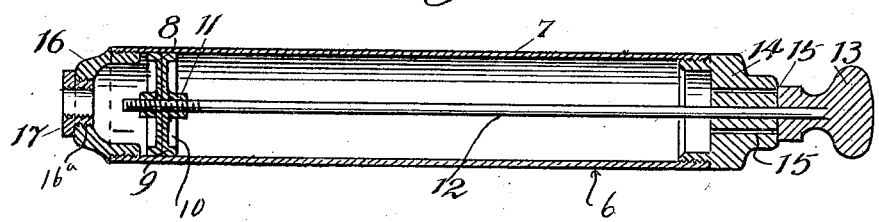
Fig. 2
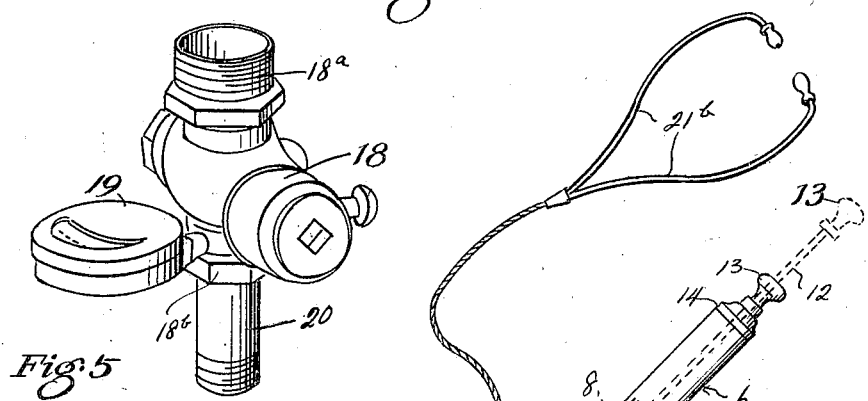
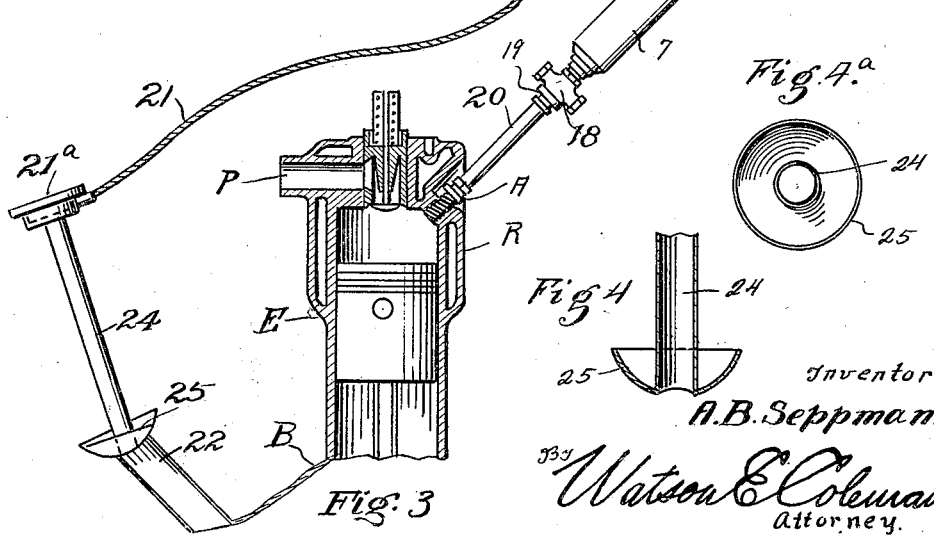
Inventor
A. B. Seppmann
By Watson E. Coleman
Attorney.

June 3, 1924.
A. B. SEPPMANN
1,496,384
TROUBLE FINDER
Filed April 14, 1923
2 Sheets-Sheet 2
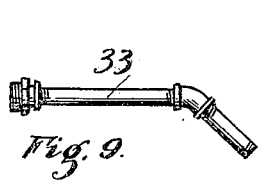
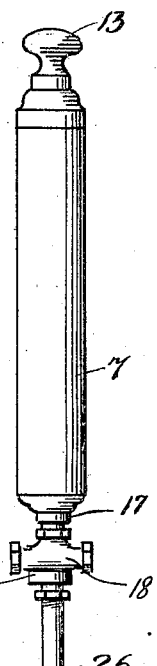
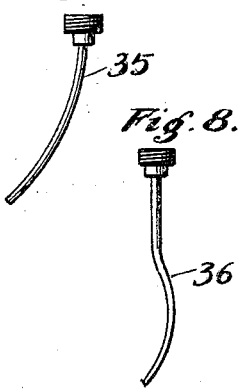
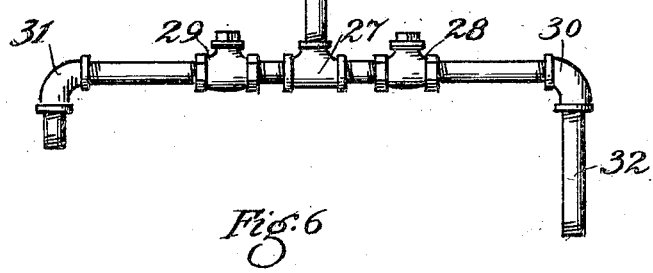
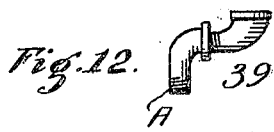
Inventor
A. B. Seppmann
By Watson E. Coleman
Attorney Patented June 3, 1924.

1,496,384

UNITED STATES PATENT OFFICE.

ALFRED BRUNO SEPPMANN, OF LAKE CRYSTAL, MINNESOTA.

TROUBLE FINDER.

Application filed April 14, 1923. Serial No. 632,091.

*To all whom it may concern:*

Be it known that I, ALFRED B. SEPPMANN, a citizen of the United States, residing at Lake Crystal, in the county of Blue Earth and State of Minnesota, have invented certain new and useful Improvements in Trouble Finders, of which the following is a specification, reference being had to the accompanying drawings.

This invention relates to garage tools and has for a particular object thereof the provision of a testing apparatus, in combination with accessories permitting its use not only in testing engines to determine faults therein but likewise permitting to serve for a number of purposes for which tool, including a pump, is desired about a garage.

A further object of the invention is to provide in combination with a test pump for applying pressure thereto the cylinders of engines to determine whether or no the same are leaky, means whereby it may be readily determined just where the leak is occurring, if a leak be found to be present.

A still further object of the invention is to provide a testing device of the stethoscope type, which is well-known to those familiar with the art and often employed in testing engines to determine where a hidden fault may lie, means whereby this device may be so engaged with the engine as to exclude exterior noises.

These and other objects I attain by the construction shown in the accompanying drawings, wherein for the purpose of illustration is shown a preferred embodiment of my invention and wherein like reference characters designate like parts throughout.

In the drawings:—

Figure 1 is a side elevation of the pump employed;

Figure 2 is a longitudinal section therethrough;

Figure 3 is a view showing the apparatus in use for testing the cylinder of an engine;

Figure 4 is a sectional view through the tube of the stethoscope apparatus;

Figure 4ª is a plan view of the apparatus showing the form of the adapter;

Figure 5 is a perspective view of one of the attachments for the pump;

Figure 6 is a side elevation of the pump showing certain of the attachments connected thereto;

Figures 7, 8 and 9 are side elevations of various forms of nozzles;

Figures 10, 11 and 12 are side elevations of adapters for connecting the device with various spark plug openings; and Figure 13 is a sleeve employed for connecting the adapters with the pump.

Referring now more particularly to the drawings, numeral 6 generally designates a pump, comprising a barrel 7, piston 8 and heads 14 and 16, the heads 14 and 16 having threaded engagement with the ends of the cylinder. The piston 8 consists of a pair of oppositely disposed cup leathers held in position by clamping plates 10 which are in turn positioned upon a piston rod 12 by lock nuts 11. The piston 12 is slidably directed through the head 14 and is provided at its outer end with an operating handle 13, of any suitable character, it being preferred that this operating handle cover the outer ends of the breather openings 15, formed in the head 14, to thereby exclude, when engaged with the head, the passage of dirt or dust to the cylinder. The head 16 is provided with a central threaded opening 16ª, adapted for the interchangeable reception of a bushing 17 or certain accessories hereinafter to be more particularly described. One of these accessories is shown in Figure 5 and comprises a stop cock 18, adapted at one end designated at 18ª for engagement with the pump, the outlet end 18ᵇ thereof having in communication with its bore a gauge 19, responding to and indicating abnormal pressure.

In the direct use of the pump as a testing device this outlet end is engaged with an extension to 20, having at its end an adapter A which may be either the form shown in Figures 3 and 10 or of the form shown in the Figures 11 and 12, depending upon positioning and accessibility of the spark plug opening of the cylinder of the engine E which is to be tested. In use of the device with some forms of cylinders the substitution of an angle pipe, such as shown in Figure 9 at 33, for the pipe 20 may be found desirable. In attaching the adapter shown in Figure 11 to either the pipe 20 or 33, a sleeve such as shown in Figure 13 at 40 is employed for making the connection of the adapter, in each instance the adapter portion and the pipe 20 or 33 engaged therein.

With the pump and its associated accessories attached, as shown in Figure 3, and it being desired to test the engine to determine the compression retaining ability of the cylinder the piston thereof is shifted until it reaches its uppermost position in the cylinder. During movement of the piston to such position or what is known as top center the valve 18 is closed so that the pressure caused by the rise of the piston in the cylinder acts upon the gauge 19 and is readable thereon, particular attention being directed to the fact that with the valve 18 closed the pressure reading is accurate in that none of the pressure from the engine cylinder escapes to the cylinder of the pump. By viewing this gauge the rapidity of leakage of the pressure thus formed from the cylinder may be determined and with a little practice will easily become known whether or no the cylinder is functioning properly. As is well-known to those familiar with the art, leakage from the cylinders of internal combustion engines can be from any one of three separate causes, pressure may be escaping past the piston ring, through an intake valve or through the exhaust valve. In order to determine at which of these points the fault lies I employ an apparatus such as shown at 21 in Figure 3, including a reproducer and sound intensifier 21$^a$ and ear pieces 21$^b$ connected with the reproducer and adapted for engagement in the ears of the person making the test. In order to determine where this leak is occurring the piston of the pump is operated to form pressure within the engine, the reproducer 21$^a$ positioned consecutively at the breather pipe 22 of the engine base B and at the intake and exhaust ports P thereof, a hissing sound will be heard and indicating the leakage. It will be obvious that this hissing sound will be loudest at the point where the escape occurs. If this escape is past the rings it will be loudest in the base, if past the intake valve it will be loudest at the intake port, etc.

It will also be obvious to those familiar with the construction of internal combustion engines that the adaption of a sound intensifier 21$^a$ to such breather pipe and ports of different engines will be difficult due to the fact that in different types of engines these ports vary as to size and accordingly an intensifier fitting the port or breather pipe of one engine would not properly engage with the breather pipe of a second engine and would permit outside noises to interfere with the test which is necessarily very delicate. In order to provide against such interference I provide the intensifier 21$^a$ with a tubelike extension 24, having upon its free end a bell 25 formed of soft rubber, the end of the tube being included in the concavity and the tube opening through the bell. This bell can be forced into breather pipes or ports of different sizes and because of its texture will conform to the shaping thereof and prevent the entrance of outside noises.

This apparatus has been found to be particularly well adapted for use in determining whether the motor has a piston slap and whether the connecting rod bearings and main bearings thereof are tight. For this purpose the piston of the engine cylinder is so positioned that its crank stands at an angle with the result that the piston is crowded against one wall of the cylinder. If the pump piston is now reciprocated the result will be that the pressure within the cylinder is alternately above and below normal pressure. As soon as the base of the engine or that portion thereof below the piston is in communication with the atmosphere through its breather port the piston will move in response to this changing pressure and cause a sound within the engine by such movement. By observation and practice it can be determined from the sound noticeable during such movement whether the movement is caused by a loose bearing or by a loose or ill-fitting piston.

It will be obvious that a pump such as above described is capable of many uses other than that as a tester and I have therefore provided a plurality of nozzles of different forms which are engageable with the pump and permit the use of the same for such other purposes. In Figures 7 and 8 I have shown nozzles which when attached to the pump permit the use of the same for injecting grease to or withdrawing grease from the differential housing of the vehicle, the bushing 17 being removed from the head 16 to permit engagement of these nozzles. It will be obvious that the construction of the head 16 is such that all grease remaining in the gun may be cleaned therefrom by the insertion of the finger in the opening 16$^a$. In Figure 6 I have shown an assemblage which permits the device to be used either as a pump for exhausting fluids from tanks or the like, as for example, for use in withdrawing the contents of a fuel tank or for applying pressure to such tanks as for testing a radiator or the like. This assemblage includes a conduit 26, engageable either directly with the pump through the bushing 17 or with the outlet end of the stop cock 18. The free end of this conduit connects with a T 27, which is in turn connected with check valves 28 and 29, one of these valves opening toward the T and pump and the other of these valves opening away from the T and pump to the ends of the valves. Fittings 31 and 32 may be applied to serve the purpose desired. With the parts in a position shown in Figure 6 it will be obvious that reciprocation of the handle 13 will result in suction being created at the nozzle 32 and pressure being created at the nozzle 31. It will also be obvious that this pressure will be readable upon the gauge 19. Accordingly, the device may be employed for testing of radiator tanks or the like by applying pressure thereto, this pressure being readable on the gauge. In employing the device for withdrawing liquids from the tanks the stop cock 18 and gauge 19 are removed since the action of such fluids upon the gauge has a tendency to be detrimental.

It will be obvious that a tool of this type will be capable of practically unlimited use about a garage and at the same time may be comparatively cheaply produced and will be extremely durable in service. It will furthermore be obvious that the structure hereinbefore set forth is capable of some change and modification without materially departing from the spirit of my invention and I accordingly do not limit myself to such specific structure except as hereinafter claimed.

I claim:—

1. In a testing device and in combination with means for producing pressure in the cylinder of an internal combustion engine, means for detecting the escape of fluid under pressure, comprising a sound intensifier and means for engaging the intensifier with a port of the engine excluding outside noises.

2. In a testing device and in combination with means for producing pressure in the cylinder of an internal combustion engine, means for detecting the escape of fluid under pressure, comprising a sound intensifier and means for engaging the intensifier with a port of the engine excluding outside noises, including a bell formed of pliable resilient material connected with the intensifier.

3. In a testing device and in combination with means for producing pressure in the cylinder of an internal combustion engine, means for detecting the escape of fluid under pressure, comprising a sound intensifier and means for engaging the intensifier with a port of the engine excluding outside noises, including a tubelike extension on the intensifier and a bell of resilient pliable material engaged with the free end of the tube and through which the tube opens.

In testimony whereof I hereunto affix my signature.

ALFRED BRUNO SEPPMANN.